US008409684B2

(12) United States Patent
Okuda et al.

(10) Patent No.: US 8,409,684 B2
(45) Date of Patent: Apr. 2, 2013

(54) RELEASE SHEET FOR STAMPER-RECEIVING LAYER, AND OPTICAL RECORDING MEDIUM-PRODUCING SHEET

(75) Inventors: Takuya Okuda, Tokyo (JP); Shin Kubota, Tokyo (JP)

(73) Assignee: Lintec Corporation, Tokyo (JP)

( * ) Notice: Subject to any disclaimer, the term of this patent is extended or adjusted under 35 U.S.C. 154(b) by 793 days.

(21) Appl. No.: 12/450,179

(22) PCT Filed: Mar. 5, 2008

(86) PCT No.: PCT/JP2008/053991
§ 371 (c)(1),
(2), (4) Date: Oct. 8, 2009

(87) PCT Pub. No.: WO2008/126524
PCT Pub. Date: Oct. 23, 2008

(65) Prior Publication Data
US 2010/0040822 A1    Feb. 18, 2010

(30) Foreign Application Priority Data

Mar. 30, 2007   (JP) ................................. 2007-092158

(51) Int. Cl.
*B32B 3/02*    (2006.01)

(52) U.S. Cl. ........ 428/64.1; 428/64.4; 428/447; 528/32; 528/33; 528/37

(58) Field of Classification Search ................. 428/64.1, 428/64.4, 65.2, 447; 528/32, 33, 37
See application file for complete search history.

(56) References Cited

U.S. PATENT DOCUMENTS 5,468,816 A * 11/1995 Hurford et al. ................ 525/479
6,858,316 B2 * 2/2005 Kubota et al. .................. 428/500

FOREIGN PATENT DOCUMENTS

| JP | 2002-025110 A | 1/2002 |
| JP | 3338660 B2 | 8/2002 |
| JP | A-2003-272260 | 9/2003 |
| JP | 2005-255706 A | 9/2005 |
| JP | 2007-185896 A | 7/2007 |

OTHER PUBLICATIONS

Extended European Search Report dated Dec. 7, 2011 for the corresponding International patent application No. PCT/JP2008/053991.
International Search Report of the International Searching Authority mailed on Jun. 17, 2008 for the corresponding international patent application No. PCT/JP2008/053991 (English translation enclosed).

* cited by examiner

*Primary Examiner* — Gerard Higgins
(74) *Attorney, Agent, or Firm* — Posz Law Group, PLC

(57) ABSTRACT

A release sheet, on which a stamper receiving layer for producing an optical recording medium is laminated, comprising a release agent layer on a side to which the stamper receiving layer is laminated, wherein the release agent layer is formed using a release agent that contains an organopolysiloxane (other than an MQ resin below) containing an alkenyl group in the molecule, an MQ resin containing an alkenyl group and having, as constituent components, M units represented by formula (1)

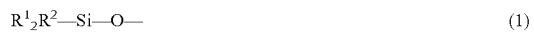

$$R^1{}_2R^2\text{—Si—O—} \qquad (1)$$

(where, $R^1$ denotes an organic group and $R^2$ denotes an alkenyl group), and Q units represented by formula (2)

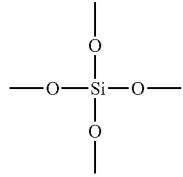
(2)
and a cross-linking agent, and that does not substantially contain particles consisting of inorganic matter, and
the alkenyl group content in said MQ resin ranges from 0.5 to 5 wt %. The release sheet can reduce concave defects on a convex-concave pattern transfer surface of the stamper receiving layer.
11 Claims, 2 Drawing Sheets

RELEASE SHEET FOR STAMPER-RECEIVING LAYER, AND OPTICAL RECORDING MEDIUM-PRODUCING SHEET

CROSS REFERENCE TO RELATED APPLICATIONS

This application is a U.S. national stage application of PCT/JP2008/053991 filed on Mar. 5, 2008, and claims priority to, and incorporates by reference, Japanese Patent Application No. 2007-092158 filed on Mar. 30, 2007.

TECHNICAL FIELD

The present invention relates to a release sheet for stamper-receiving layer, on which a stamper-receiving layer to be used for producing an optical recording medium is laminated, and to an optical recording medium-producing sheet comprising the release sheet for stamper-receiving layer.

BACKGROUND ART

In conventional optical recording medium manufacture, known methods for forming convex-concave shapes called pits or groove/lands, for information recording, include methods wherein a convex-concave pattern corresponding to the convex-concave shapes is transferred from a stamper having the convex-concave pattern to a constituent layer of the optical recording medium. As layers onto which the convex-concave pattern is transferred, stamper-receiving layers, wherein once the convex-concave pattern has been transferred thereto from the stamper, the layers are cured through irradiation of energy beams and the convex-concave pattern is fixed thereby, are studied. Optical recording medium-producing sheets having such stamper-receiving layers have ordinarily a structure wherein one or both faces of the stamper-receiving layer are protected by a release sheet.
Patent document 1: Japanese Patent No. 3338660
Patent document 2: Japanese Patent Application Laid-open No. 2002-25110

DISCLOSURE OF THE INVENTION

Problem to be Solved by the Invention

The convex-concave pattern transferred to the stamper-receiving layer constitutes pits or groove/lands that are important for recording information in the optical recording medium. Therefore, there should be no irregularities, other than the convex-concave pattern, on the convex-concave pattern transfer surface of the stamper-receiving layer, with a view to achieve accurate reproduction of the recorded information.

In conventional optical recording medium-producing sheets, however, concave-shaped defects (concave defects) having a diameter of about 500 μm may occur on the convex-concave pattern transfer surface of the cured stamper-receiving layer. Such concave defects on the convex-concave pattern transfer surface of the cured stamper-receiving layer may give rise to signal errors at portions where the concave defects are present, when the stamper-receiving layer is built into the optical recording medium.

In the light of the above, it is an object of the present invention to provide a release sheet for stamper-receiving layers, and an optical recording medium-producing sheet, where concave defects are unlikely to occur in the convex-concave pattern transfer surface of the stamper-receiving layer.

Means for Solving the Problem

In order to achieve the above object, a first invention is a release sheet for stamper-receiving layer, on which a stamper-receiving layer to be used for producing an optical recording medium is laminated, the release sheet comprising, on a side to which said stamper-receiving layer is laminated, a release agent layer, wherein the release agent layer is formed using a release agent that contains an organopolysiloxane (other than an MQ resin below) containing an alkenyl group in the molecule, an MQ resin containing an alkenyl group and having, as constituent components, M units represented by formula (1)

(where, $R^1$ denotes an organic group and $R^2$ denotes an alkenyl group), and Q units represented by formula (2)

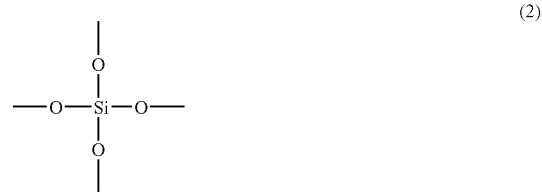

and a cross-linking agent, and that does not substantially contain particles consisting of inorganic matter, and the alkenyl group content in the MQ resin ranges from 0.5 to 5 wt % (Invention 1).

The diameter of concave defects that appear in the convex-concave pattern transfer surface of conventional stamper-receiving layers is of about 500 μm. Therefore, these concave defects are believed to be caused by particles consisting of inorganic matter, for instance silica particles or the like, that are added to the release agent layer of a heavy release force type release sheet that is laminated on the convex-concave pattern transfer surface of the stamper-receiving layer. Thus, particles consisting of inorganic matter should not be added, but this would preclude obtaining heavy-release force, since the purpose of adding particles consisting of inorganic matter is to achieve heavy release. In the present invention (Invention 1), the alkenyl group content in the MQ resin is greater than usual, which allows increasing cross-linking density and achieving a desired release force, even when not using particles consisting of inorganic matter.

The "optical recording medium" in the present description encompasses any medium where information can be recorded and reproduced optically. Although not limited thereto, such media include mainly reproduction-only, write-once or rewritable disk-like media (for instance, so called optical disks (including magnet-optical disks) such as CD, CD-ROM, CD-R, CD-RW, DVD, DVD-ROM, DVD-R, DVD-RW, DVD-RAM, LD, Blu-ray Disc, HD DVD and MO).

In the above invention (Invention 1), preferably, the alkenyl group content in the organopolysiloxane ranges from 0.1 to 3 wt % (Invention 2).

In the above inventions (Inventions 1 and 2), preferably, the surface roughness (Ra) of the release agent layer is not greater than 0.05 μm, and the surface roughness (Rz) of the release agent layer is not greater than 4.0 μm (Invention 3).

In the above inventions (Inventions 1 to 3), preferably, the release agent layer has a release force of 300 to 800 mN/50 mm relative to the stamper-receiving layer before curing that is laminated on the release agent layer (Invention 4).

A second invention provides an optical recording medium-producing sheet comprising the above-mentioned release sheet (Inventions 1 to 4); and an energy-beam curable stamper-receiving layer, laminated on the release agent layer of the release sheet, and having a storage elastic modulus before curing of $1 \times 10^3$ to $1 \times 10^6$ Pa (Invention 5).

A third invention provides an optical recording medium-producing sheet comprising a first above-mentioned release sheet (Invention 4); an energy-beam curable stamper-receiving layer, laminated on the release agent layer of the first release sheet, and having a storage elastic modulus before curing of $1 \times 10^3$ to $1 \times 10^6$ Pa; and a second release sheet, laminated on the stamper-receiving layer on an opposite side to the first release sheet, and having a release force of 50 to 200 mN/50 mm relative to the stamper-receiving layer (Invention 6).

Advantageous Effect of the Invention

The present invention allows suppressing the occurrence of concave defects, caused by the release sheet, on the convex-concave pattern transfer surface of the stamper-receiving layer, while achieving a desired release force in the release sheet.

EXPLANATION OF REFERENCE NUMERALS

Figure 1:
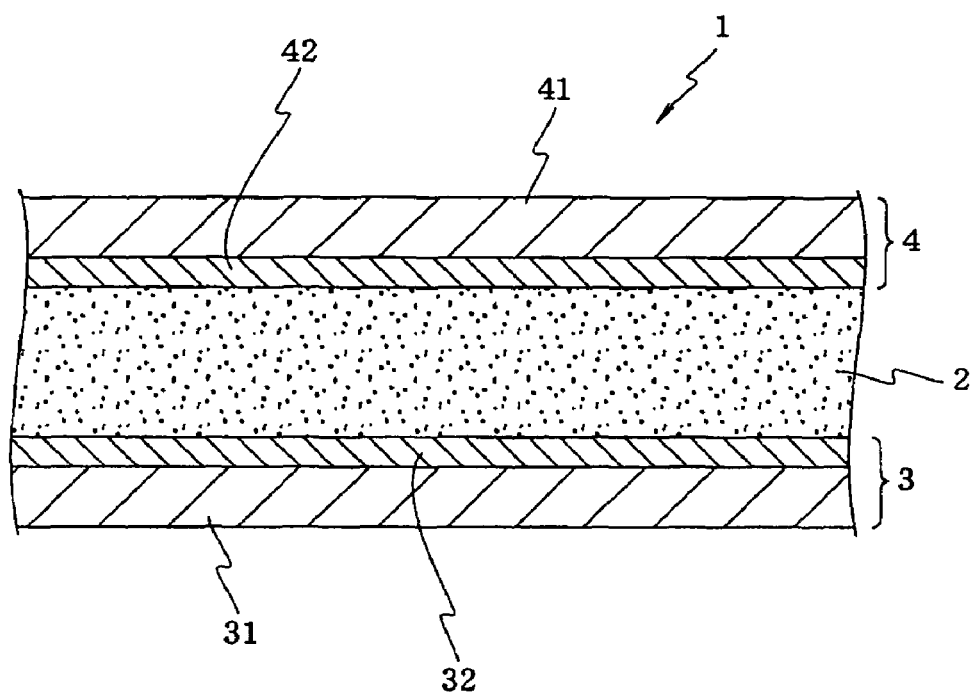
FIG. 1 is a cross-sectional diagram of an optical recording medium-producing sheet according to an embodiment of the present invention.

1 . . . optical recording medium-producing sheet
2 . . . stamper-receiving layer
3 . . . heavy release force type release sheet
31 . . . base material
32 . . . release agent layer
4 . . . light release force type release sheet
41 . . . base material
42 . . . release agent layer

BEST MODE FOR CARRYING OUT THE INVENTION

Hereinafter, an embodiment of the present invention will be explained.

FIG. 1 is a cross-sectional diagram of an optical recording medium-producing sheet according to an embodiment of the present invention. As illustrated in FIG. 1, an optical recording medium-producing sheet 1 according to the present embodiment comprises a stamper-receiving layer 2, a heavy release force type release sheet 3 laminated on the face of the stamper-receiving layer 2 where a convex-concave pattern is to be transferred (lower face in FIG. 1), and a light release force type release sheet 4 laminated on the other face of the stamper-receiving layer 2 (upper face in FIG. 1).

The heavy release force type release sheet 3 comprises a base material 31, and a release agent layer 32 formed on the face of the base material 31 on a side to which the stamper-receiving layer 2 is laminated.

The base material 31 of the heavy release force type release sheet 3 is not particularly limited, and may be appropriately selected from among any base materials used in conventional release sheets. Examples of such a base material 31 include resin films, for instance, polyester films such as polyethylene terephthalate or polyethylene naphthalate films; polyolefin films such as polypropylene or polymethylpentene films; or polycarbonate films, polyvinyl acetate films or the like.

The thickness of the base material 31 is not particularly limited, but ranges ordinarily from about 10 to about 200 μm, preferably from about 25 to about 75 μm.

The release agent layer 32 of the heavy release force type release sheet 3 is a layer formed using a heavy release force type release agent (hereafter, "release agent H"). The release agent H contains at least an organopolysiloxane (A) as a base polymer, an MQ resin (B) and a cross-linking agent (C), and does not substantially contain particles consisting of inorganic matter (for instance silica particles). Such substantial absence of particles consisting of inorganic matter allows preventing the particles from forming protrusions on the release agent layer 32, and allows enhancing the smoothness of the surface of the release agent layer 32. In turn, this allows suppressing the occurrence of concave defects in the convex-concave pattern transfer surface of the stamper-receiving layer 2 that is closely touched to the release agent layer 32.

The organopolysiloxane (A) is an organopolysiloxane containing an alkenyl group in the molecule, other than the below-described MQ resin (B). As the organopolysiloxane (A) there is preferably used a diorganopolysiloxane having, as a main structural unit, the bifunctional structural unit (D unit) represented by formula (3).

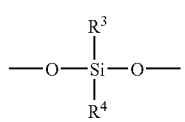
(3)

In formula (3), $R^3$ denotes a substituted or unsubstituted C1 to C20, preferably C1 to C12 alkyl group or aryl group, for instance an alkyl group such as a methyl group, ethyl group, propyl group or butyl group; a cycloalkyl group such as a cyclohexyl group; an aryl group such as a phenyl group or tolyl group; or a chloromethyl group, a trifluoropropyl group, a cyanoethyl group or the like resulting from substituting some or all the hydrogen atoms of the foregoing groups with a halogen atom, a cyano group or the like. Industrially preferred among the above groups is a methyl group or phenyl group.

Meanwhile, $R^4$ is the same functional group as $R^3$, or is selected from among a preferably C2 to C8 alkenyl group such as a vinyl group, allyl group or propenyl group, a C1 to C8 alkoxy group such as a methoxy group, ethoxy group, propoxy group or methoxyethoxy group, or hydroxyl group or epoxy group. Industrially preferred among the foregoing are methyl, phenyl or vinyl groups. $R^3$ and $R^4$ may be identical or dissimilar.

The O (oxygen atom) in formula (3) forms siloxane bonds shared by adjacent structural units.

Preferably, the ends of the above-described diorganopolysiloxane are capped by hydroxyl groups or by monofunctional structural units represented by formula (4) and that share an oxygen atom

 (4)

(In formula (4), $R^3$ and $R^4$ may be the same as above, but preferably $R^3$ is a methyl group or phenyl group, and $R^4$ is a methyl group, phenyl group or vinyl group. n is an integer from 1 to 3).

The above-described diorganopolysiloxane has essentially a linear structure, but may also have a branched structure partially comprising trifunctional structural units (T units) represented by formula (5) and/or tetrafunctional structural units (Q units) represented by formula (2).

 (5)

(In formula (5), $R^4$ may be the same as above, but is preferably methyl group, phenyl group or vinyl group, in industrial terms.)

In formula (3) and formula (5), a predetermined proportion of $R^4$ must be an alkenyl group, preferably, in particular, a vinyl group. The alkenyl group content in the organopolysiloxane (A) ranges preferably from 0.1 to 3 wt %, in particular from 0.5 to 2.5 wt %. When the alkenyl group content is smaller than 0.1 wt %, cross-linking density cannot be sufficiently increased, which may preclude obtaining a desired release force in the formed release agent layer 32. On the other hand, the cross-linking density becomes excessive when the content of alkenyl group is greater than 3 wt %, which may preclude obtaining a desired release force in the formed release agent layer 32.

The average degree of polymerization of the organopolysiloxane (A) ranges preferably from 2000 to 7000, in particular from 3000 to 6000.

The MQ resin (B) comprises, as constituent components, monofunctional structural units (M units) represented by formula (1)

 (1)

and tetrafunctional structural units (Q units) represented by formula (2)

 (2)

In formula (1), $R^1$ denotes an organic group and $R^2$ an alkenyl group. Preferably, the organic group of $R^1$ is a C1 to C20, preferably a C1 to C12 substituted or unsubstituted alkyl group or aryl group, for instance an alkyl group such as a methyl group, ethyl group, propyl group or butyl group; a cycloalkyl group such as a cyclohexyl group; an aryl group such as a phenyl group or tolyl group; or a chloromethyl group, a trifluoropropyl group, a cyanoethyl group or the like resulting from substituting some or all the hydrogen atoms of the foregoing groups with a halogen atom, a cyano group or the like; in industrial terms, $R^1$ is preferably a methyl group or phenyl group.

Examples of the alkenyl group include, for instance, a vinyl group, allyl group, methacryl group, hexenyl group, butadienyl group, hexadienyl group, cyclopentenyl group, cyclopentadienyl group, cyclohexenyl group or the like, preferably, in particular, vinyl group.

The O (oxygen atom) in formula (1) and formula (2) forms siloxane bonds shared by adjacent structural units.

Preferably, the ends of the MQ resin (B) are capped by hydroxyl groups or by monofunctional structural units, represented by formula (4), that share an oxygen atom.

Besides those represented by formula (1), the M units of the MQ resin (B) may be also units in which $R^2$ in formula (1) is the same organic group as $R^1$ ($R^1$ and $R^2$ may be identical or dissimilar).

Fundamentally, the MQ resin (B) comprises only M units represented by formula (1) and Q units represented by formula (2), but may also partially comprise D units represented by formula (3) and/or T units represented by formula (5).

The alkenyl group content in the MQ resin (B) ranges preferably from 0.5 to 5 wt %, in particular from 1 to 4 wt %. When the alkenyl group content is smaller than 0.5 wt %, cross-linking density cannot be sufficiently increased, which may preclude obtaining a desired release force in the formed release agent layer 32. On the other hand, cross-linking density becomes excessive when the content of alkenyl group is greater than 5 wt %, which may preclude obtaining a desired release force in the formed release agent layer 32.

The weight-average molecular weight of the MQ resin (B) ranges preferably from 1000 to 7000, in particular from 2000 to 6000.

The blending amount of the MQ resin (B) ranges preferably from 30 to 90 parts by weight, in particular from 40 to 80 parts by weight, relative to 100 parts by weight of the organopolysiloxane (A). When the blending amount of the MQ resin (B) is smaller than 30 parts by weight, cross-linking density cannot be sufficiently increased, which may preclude obtaining a desired release force in the formed release agent layer 32. On the other hand, when the blending amount of the MQ resin (B) is greater than 90 parts by weight, the cross-linking density becomes excessive, which may preclude obtaining a desired release force in the formed release agent layer 32.

As the cross-linking agent (C) there can be used, for instance, a polyorganosiloxane having at least two hydrogen atoms bonded to silicon atoms in the molecule. Specific examples thereof include silicone resins such as a dimethylhydrogensiloxy end-capped dimethylsiloxane-methylhydrogensiloxane copolymer, a trimethylsiloxy end-capped dimethylsiloxane-methylhydrogensiloxane copolymer, a trimethylsiloxy end-capped poly(methylhydrogensiloxane), or a poly (hydrogen silsesquioxane). The usage amount of the cross-linking agent ranges ordinarily from 0.1 to 100 parts by weight, preferably from 0.3 to 50 parts by weight, relative to a total 100 parts by weight of organopolysiloxane (A) and MQ resin (B).

Besides the components (A) to (C) above, the release agent H may optionally contain a catalyst, an addition reaction inhibitor and the like. The catalyst used may be an ordinary platinum-group compound. Examples of platinum-group compounds include, for instance, platinum chloride complexes, chloroplatinic acid, alcohol-modified chloroplatinic acid, olefin complexes of chloroplatinic acid, as well as palladium or rhodium catalysts. The usage amount of the catalyst ranges from about 0.1 to about 5 parts by weight relative to the total weight of the organopolysiloxane (A), the MQ resin (B) and the cross-linking agent (C).

The addition reaction inhibitor is a component used for imparting storage stability at room temperature to the organopolysiloxane (A) and the MQ resin (B) when an addition reaction is utilized to. Specific examples of the addition reaction inhibitor include, for instance, 3,5-dimethyl-1-hexin-3-ol, 3-methyl-1-penten-3-ol, 3-methyl-3-penten-1-yne, 3,5-dimethyl-3-hexen-1-yne, tetravinyl siloxane rings, benzotriazole or the like. The usage amount of the addition reaction inhibitor ranges ordinarily from 0.01 to 20 parts by weight, preferably from 0.1 to 15 parts by weight relative to a total 100 parts by weight of the organopolysiloxane (A), the MQ resin (B) and the cross-linking agent (C).

To form the release agent layer 32 on the base material 31, the various components of the release agent H are blended first at their predetermined ratios to prepare a coating solution having a viscosity that allows coating. The organic solvent used herein is not particularly limited, and various solvents may be used, for instance a hydrocarbon compound such as toluene, hexane or heptane, as well as ethyl acetate, methyl ethyl ketone or mixtures of the foregoing.

The coating solution thus prepared is coated onto the surface of the base material 31 by, for instance, gravure coating, bar coating, spray coating or the like. The solids-basis coating amount is appropriately adjusted so as to range ordinarily from 0.01 to 3.0 g/m$^2$, preferably from 0.02 to 1.5 g/m$^2$. Application of the coating solution is followed by drying, heating, UV irradiation or the like, to cure the release agent H and yield thereby the release agent layer 32.

The thickness of the release agent layer 32 ranges preferably from 0.03 to 0.2 µm, in particular from 0.05 to 0.15 µm.

The release agent layer 32 exhibits excellent surface smoothness, since it is formed using the release agent H, which does not substantially contain particles consisting of inorganic matter. Specifically, it is possible to form a release agent layer 32 having a surface roughness (Ra) no greater than 0.05 µm and a surface roughness (Rz) no greater than 4.0 µm.

Such surface roughness in the release agent layer 32 allows suppressing the occurrence of concave defects in the convex-concave pattern transfer surface of the stamper-receiving layer 2 that is closely touched to the release agent layer 32. Specifically, the frequency of occurrence of concave defects having diameters of 100 µm or greater in the convex-concave pattern transfer surface of the stamper-receiving layer 2 (after drying, before curing) can be kept at no more than 0.5 defects/m$^2$.

The release agent layer 32 is formed using an MQ resin having a greater alkenyl group content than usual. This allows, as a result, increasing cross-linking density and achieving greater release force. Specifically, there can be formed a heavy release force type release agent layer 32 having a release force of 300 to 800 mN/50 mm, in particular 300 to 600 mN/50 mm, relative to the stamper-receiving layer 2 before curing that is laminated on the release agent layer 32.

As described above, the silicone resin that makes up the release agent layer 32 has high cross-linking density. This allows suppressing the amount of silicone being transferred to the stamper-receiving layer 2 that is laminated on the release agent layer 32. Specifically, the amount of silicone being transferred to the convex-concave pattern transfer surface of the stamper-receiving layer 2 (after drying, before curing) can be kept no greater than 2.0 Atom %. Suppressing thus the silicone transfer amount allows reliably forming a reflective film on the convex-concave pattern transfer surface of the stamper-receiving layer 2.

The stamper-receiving layer 2, onto which the convex-concave pattern formed on the stamper is transferred, is a layer comprising pits or groove/lands. The stamper-receiving layer 2 contains, as a main component, a polymer material having energy-beam curability, preferably, an acrylate copolymer having energy-beam curable groups in the side chains, in particular, an energy-beam curable copolymer having a molecular weight not lower than 100,000 and having energy-beam curable groups in the side chains, obtained through reaction of an acrylic copolymer having monomer units that contain a functional group, and a compound containing unsaturated groups having substituents that bond to the functional group. In addition, the stamper-receiving layer 2 contains optionally a photopolymerization initiator, a polymer component or oligomer component lacking energy-beam curability, an energy-beam curable polyfunctional monomer or oligomer component, a cross-linking agent, as well as other additives (UV absorbents, plasticizers, fillers, antioxidants, tackifiers, pigments, dyes, coupling agents or the like).

The storage elastic modulus of the stamper-receiving layer 2 before curing ranges preferably from $1\times10^3$ to $1\times10^6$ Pa, in particular from $1\times10^4$ to $5\times10^5$ Pa. The measurement temperature of the "storage elastic modulus before curing" is a temperature identical to that of the work environment where the stamper is superposed (pressed) against the optical recording medium-producing sheet 1. That is, when the stamper and the optical recording medium-producing sheet 1 are superposed at room temperature, the storage elastic modulus is measured at room temperature, and when the stamper and the optical recording medium-producing sheet 1 are superposed under heating, the storage elastic modulus is measured at the same temperature as the heating temperature.

When the storage elastic modulus of the stamper-receiving layer 2 before curing is kept within the above ranges, the convex-concave pattern formed on the stamper is transferred precisely to the stamper-receiving layer 2 by merely pressing the stamper against the stamper-receiving layer 2. This makes optical disk manufacture extremely simple.

The storage elastic modulus of the stamper-receiving layer 2 after curing is preferably not smaller than $1\times10^7$ Pa, and in particular, ranges from $1\times10^8$ to $1\times10^{11}$ Pa. The measurement temperature of the "storage elastic modulus after curing" is set at the same temperature as that of the storage environment of the optical disk, i.e. at room temperature.

When the storage elastic modulus of the stamper-receiving layer 2 after curing is kept within the above range, the pits or groove/lands transferred to the stamper-receiving layer 2 become reliably fixed through curing. This allays the concern of breakage and/or deformation of the pits or groove/lands during separation of the stamper and the stamper-receiving layer 2.

The thickness of the stamper-receiving layer 2 is determined in accordance with the depth of the pits or grooves to be formed, but ranges ordinarily from about 5 to about 100 µm, preferably from about 5 to about 50 µm.

The light release force type release sheet 4 comprises a base material 41 and a release agent layer 42 formed on the face of the base material 41 onto which the stamper-receiving layer 2 is laminated.

The base material 41 of the light release force type release sheet 4 is not particularly limited, and the base materials that are exemplified above as the base material 31 of heavy release force type release sheet 3 may be used as the base material 41.

The release agent layer 42 of the light release force type release sheet 4 is a layer formed using a light release force type release agent. So long as the release agent layer 42 has a desired release force, the light release force type release agent used is not particularly limited, and may be, for instance, a silicone resin, a fluororesin, an alkyd resin, a long-chain alkyl resin or the like. Preferably, the release agent has a silicone resin as a main component. The release force of the release agent layer 42 ranges preferably from 50 to 200 mN/50 mm, in particular from 50 to 150 mN/50 mm.

The light release force type release sheet 4 can be produced in accordance with the same method as the above-described heavy release force type release sheet 3.

To manufacture the optical recording medium-producing sheet 1 according to the present embodiment there may be prepared a coating solution of the material that makes up the stamper-receiving layer 2, the coating solution being then coated, by, for instance, gravure coating, bar coating or spray coating, onto one of the release sheets, ordinarily onto the release agent layer 32 of the heavy release force type release sheet 3, followed by drying, to form the stamper-receiving layer 2. Thereafter, the other release sheet, ordinarily the release agent layer 42 of the light release force type release sheet 4, may be laminated onto the surface of the stamper-receiving layer 2 in such a manner that the release agent layer 42 is in contact with the stamper-receiving layer 2.

Figure 2:
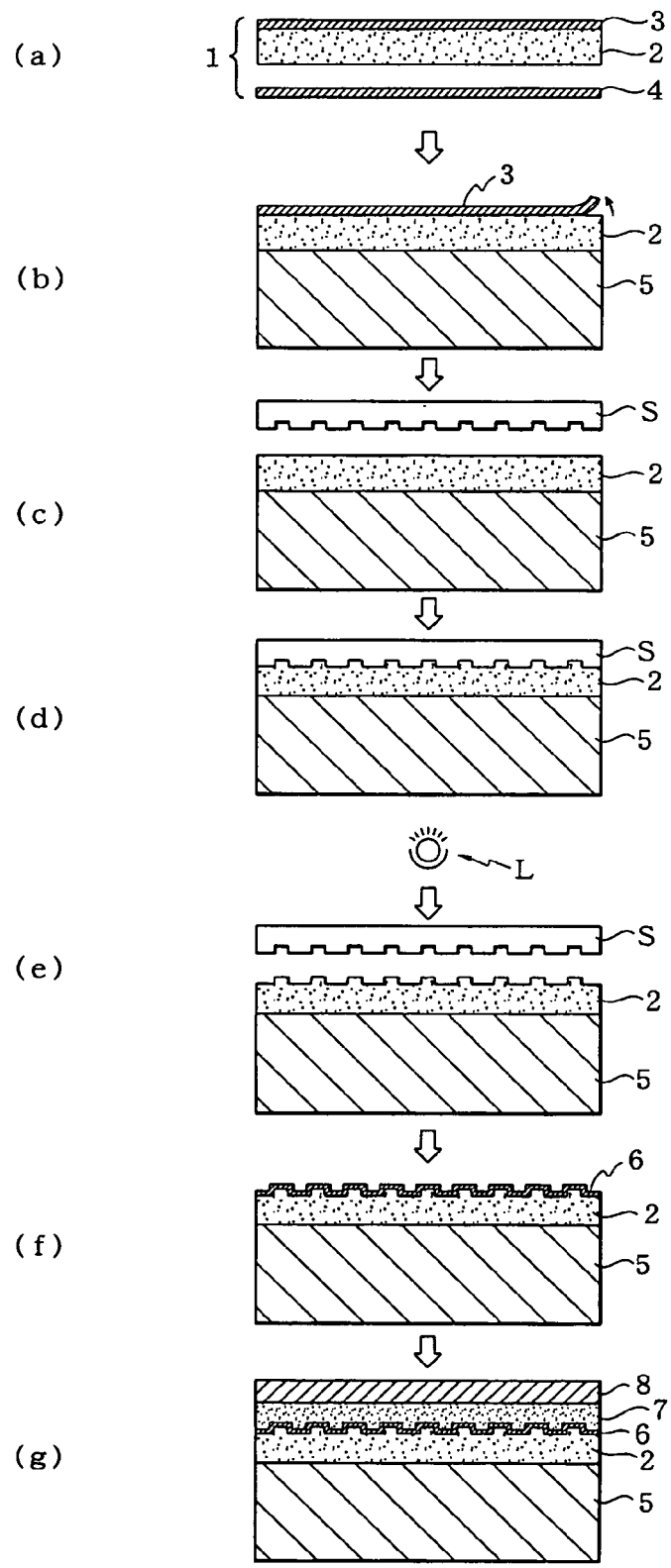
FIG. 2 is a diagram illustrating an example of method for producing an optical recording medium using the optical recording medium-producing sheet according to the embodiment.

With reference to FIG. 2, an explanation follows next on an example of a method for producing an optical recording medium using the above-described optical recording medium-producing sheet 1.

Firstly, the light release force type release sheet 4 of the optical recording medium-producing sheet 1 is peeled off, to expose one of the faces of the stamper-receiving layer 2, as illustrated in FIG. 2(a). The stamper-receiving layer 2 can be prevented from peeling off the heavy release force type release sheet 3 because of the release force difference of the light release force type release sheet 4 and the heavy release force type release sheet 3 relative to the stamper-receiving layer 2.

Next, the exposed stamper-receiving layer 2 is laminated and pressure-bonded onto an optical recording medium substrate 5 made of polycarbonate, as illustrated in FIG. 2(b). The heavy release force type release sheet 3 laminated on the stamper-receiving layer 2 is peeled off, to expose the convex-concave pattern transfer surface of the stamper-receiving layer 2, as illustrated in FIG. 2(c).

Next, a stamper S is pressed against the surface of the exposed stamper-receiving layer 2, to transfer the convex-concave pattern of the stamper S to the stamper-receiving layer 2, as illustrated in FIG. 2(d). With the stamper S closely touched to the stamper-receiving layer 2, energy beams are irradiated to the stamper-receiving layer 2, using an energy beam irradiation apparatus (for instance, an UV lamp L in FIG. 2), from the side of the optical recording medium substrate 5, as illustrated in FIG. 2(e). The stamper-receiving layer 2 is cured thereby, with an accompanying increase in storage elastic modulus.

Thereafter, the stamper S is removed off the stamper-receiving layer 2, as illustrated in FIG. 2(e). Pits or groove/lands are formed thus on the stamper-receiving layer 2 through transfer/fixing of the convex-concave pattern of the stamper S. The release agent layer 32 of the heavy release force type release sheet 3 closely touched to the stamper-receiving layer 2 is formed using a release agent not substantially containing inorganic matter particles. This has the effect of preventing formation of concave defects, caused by such particles, on the convex-concave pattern transfer surface of the stamper-receiving layer 2.

Next, a reflective film 6 is formed, by sputtering or the like, on the convex-concave pattern transfer surface of the stamper-receiving layer 2, as illustrated in FIG. 2(f). The reflective film 6 may be a multilayer film further comprising a recording layer such as a phase-change recording layer.

Lastly, a cover sheet 8 is laminated on the reflective film 6, with an adhesive 7 interposed in between, as illustrated in FIG. 2(g), to yield an optical recording medium. The optical recording medium thus obtained does not substantially have concave defects on the convex-concave pattern transfer surface of the stamper-receiving layer 2. This prevents the occurrence of signal errors caused by such concave defects.

The embodiments explained above are described to facilitate understanding of the present invention and is not to limit the present invention. Accordingly, respective elements disclosed in the above embodiments include all design modifications and equivalents belonging to the technical scope of the present invention.

EXAMPLES

Following is a more detailed description of the present invention through examples and so on; however, the scope of the present invention is not limited by these examples and so on.

Example 1

Manufacture of a Heavy Release Force Type Release Sheet

A release agent coating solution having a 1.5 wt % solids concentration was obtained by mixing, and diluting in a mixed solvent of toluene/MEK, 100 parts by weight of a mixture (BY24-567, by Dow Corning Toray Co., Ltd., solids 41 wt %, containing 60 parts by weight of MQ resin having vinyl groups relative to 100 parts by weight of dimethylpolysiloxane having vinyl groups) of dimethylpolysiloxane having vinyl groups (vinyl group content: 1.5 wt %, average degree of polymerization: 4500), polymethylhydrogensiloxane, and an MQ resin having vinyl groups (vinyl group content in the MQ resin: 2.0 wt %, weight-average molecular weight: 4000); 9.5 parts by weight of a reaction inhibitor (BY24-808, by Dow Corning Toray Co., Ltd., solids 20 wt %); and 2.5 parts by weight of a platinum catalyst (CAT-BY24-835, by Dow Corning Toray Co., Ltd., solids 100 wt %). A 38 μm-thick polyethylene terephthalate film (T-100, by Mitsubishi Chemical polyester film) was prepared then as the base material. The release agent coating solution was uniformly coated onto the base material to a coating thickness of 0.1 μm, and was cured in a thermal treatment at 140° C., to yield a release sheet which a release agent layer was formed on one face of the base material.

(Manufacture of an Optical Recording Medium-Producing Sheet)

An acrylate copolymer solution A (solids concentration 35 wt %) having a weight-average molecular weight of 850,000 was obtained by reacting 80 parts by weight of n-butyl acrylate with 20 parts by weight of acrylic acid in a mixed solvent of ethyl acetate and methyl ethyl ketone (weight ratio 50:50). In 35 parts by weight (solids) of the obtained acrylate copolymer solution A there were dissolved 2.5 parts by weight of 2,2-dimethoxy-1,2-diphenylethan-1-one (Irgacure 651, by Ciba Specialty Chemicals) as a photopolymerization initiator; 28 parts by weight of a composition comprising energy beam-curable polyfunctional monomers and oligomers (KAYARAD NKR-001, made by Nippon Kayaku Co., Ltd.); 7 parts by weight of an energy-beam curable urethane acrylate compound (Shiko UV-6020EA, by Nippon Synthetic Chemical Industry Co., Ltd.); and 0.5 parts by weight of a crosslinking agent comprising a polyisocyanate compound (Oribain BHS-8515, by Toyo Ink Mfg. Co., Ltd.); the solids concentration of the resulting solution was adjusted to 40 wt %, to yield a coating agent for stamper-receiving layer.

The obtained coating agent for stamper-receiving layer was coated by knife coater (28.5 g/m$^2$) onto the release agent layer of the heavy release force type release sheet, and was dried for 1 minute at 90° C., to form a 25 μm-thick stamper-receiving layer. To prepare an optical recording medium-producing sheet, a release sheet (SP-PET38GS, by LINTEC Corporation), as a light release force type release sheet, obtained by subjecting one face of a 38 μm-thick polyethylene terephthalate film to a release treatment with a light release force type silicone resin, was laminated on the surface of the stamper-receiving layer.

Comparative Example 1

Manufacture of a Heavy Release Force Type Release Sheet

A release agent coating solution having a 1.5 wt % solids concentration was obtained by mixing, and diluting in a mixed solvent of toluene/MEK, 50 parts by weight of a mixture (BY24-510, by Dow Corning Toray Co., Ltd., solids 30 wt %) of dimethylpolysiloxane having vinyl groups and polymethylhydrogensiloxane; 50 parts by weight of a mixture (BY24-562, by Dow Corning Toray Co., Ltd., solids 30 wt %) of silica and an MQ resin having vinyl groups (vinyl group content in the MQ resin: 2.0 wt %); 5.0 parts by weight of a reaction inhibitor (BY24-808 by Dow Corning Toray Co., Ltd., solids 20 wt %); and 2.0 parts by weight of a platinum catalyst (CAT-BY24-835 by Dow Corning Toray Co., Ltd.). A 38 μm-thick polyethylene terephthalate film (T-100, by Mitsubishi Chemical polyester film) was prepared then as the base material. The release agent coating solution was uniformly coated onto the base material to a coating thickness of 0.1 μm, and was cured in a thermal treatment at 140° C., to yield a release sheet which a release agent layer was formed on one face of the base material.

An optical recording medium-producing sheet was produced in the similar way as in Example 1 but using herein the heavy release force type release sheet obtained above.

TEXT EXAMPLES

1. Surface Roughness Measurement

The surface roughness (Ra) and surface roughness (Rz) of the release agent layers of the heavy release force type release sheets obtained in the example and comparative example were measured using a surface roughness meter (SVP-3000S4 by Mitutoyo CORPORATION). The results are given in Table 1.

2. Release Force Measurement

The release force of the light release force type release sheet from the stamper-receiving layer and the release force of the heavy release force type release sheet from the stamper-receiving layer were measured for the optical recording medium-producing sheets obtained in the example and comparative example. The results are given in Table 1.

The optical recording medium-producing sheets obtained in the example and comparative example were left to stand for 1 day in an environment at a temperature of 23° C. and 50% humidity, after which samples 50 mm wide and 200 mm long were cut out of the sheets. The heavy release force type release sheet 3 was fixed to a mount, and then the release force of the light release force type release sheet was measured using a tensile tester with which the light release force type release sheet was pulled in the 180° direction at a peeling speed of 0.3 m/minute.

To measure the release force of the heavy release force type release sheets, the light release force type release sheets were removed from the optical recording medium-producing sheets obtained in the example and comparative example, and a 50 μm-thick polyethylene terephthalate film was stuck to the exposed surface of the stamper-receiving layer. The sheets were left to stand for 1 day in an environment at a temperature of 23° C. and 50% humidity, after which samples 50 mm wide and 200 mm long were cut out. The stuck polyethylene terephthalate film was fixed to a mount, and then the release force of the heavy release force type release sheet was measured using a tensile tester with which the heavy release force type release sheet was pulled in the 180° direction at a peeling speed of 0.3 m/minute.

3. Measurement of the Number of Concave Defects

The heavy release force type release sheet was peeled off the stamper-receiving layer in the optical recording medium-producing sheets obtained in the example and comparative example. The number of concave defects on the surface of the exposed stamper-receiving layers was measured using a defect analyzer (B-LSC-5790-LA, by Mec Co.). The samples were 1000 mm wide×250 m long. The results are given in Table 2.

4. Measurement of the Silicone Transfer Amount

The heavy release force type release sheet was peeled off the stamper-receiving layer in the optical recording medium-producing sheets obtained in the example and comparative example. The silicone transfer amount at the surface of the exposed stamper-receiving layers was measured by scanning X-ray photoelectron spectroscopy (using a PHI Quantera SXM, by Ulvac Phi) (measured elements: silicon (Si) and carbon (C)). The silicone transfer amount, obtained as the value Si/(Si+C) times 100, is expressed in "Atom %". The results are given in Table 1.

TABLE 1

| | Example 1 | Comparative example 1 |
|---|---|---|
| Surface roughness (Ra) (μm) | 0.047 | 0.057 |
| Surface roughness (Rz) (μm) | 2.99 | 4.35 |
| Release force of light release force type release sheet (mN/50 mm) | 135 | 135 |
| Release force of heavy release force type release sheet (mN/50 mm) | 450 | 480 |
| Silicone transfer amount (Atom %) | 1.18 | 8.42 |

TABLE 2

|  | Example 1 | | Comparative example 1 | |
| --- | --- | --- | --- | --- |
| Size (mm) | Defect count (defects) | (defects/m²) | Defect count (defects) | (defects/m²) |
| 0.1 to 0.3 | 61 | 0.15 | 114 | 0.49 |
| 0.3 to 0.5 | 23 | 0.06 | 52 | 0.22 |
| ≧0.5 | 3 | 0.01 | 13 | 0.06 |
| Total | 87 | 0.22 | 179 | 0.77 |

Table 1 and Table 2 show a significant reduction in the number of concave defects in the stamper-receiving layer, and an extremely small amount of silicone transfer, when using the heavy release force type release sheet produced in the example.

INDUSTRIAL APPLICABILITY

The present invention is useful for producing signal error-free optical recording media with good yield.

The invention claimed is:

1. An optical recording medium-producing sheet, comprising:
   a first release sheet comprising a first base material and a first release agent layer;
   an energy-beam curable stamper-receiving layer laminated on the first release agent layer of the first release sheet and having a storage elastic modulus before curing of $1 \times 10^3$ to $1 \times 10^6$ Pa; and
   a second release sheet comprising a second base material and a second release agent layer, wherein the second release agent layer is laminated on the stamper-receiving layer on an opposite side to the first release sheet, wherein the second release agent layer has a release force of 50 to 200 mN/50 mm relative to the stamper-receiving layer,
   wherein the first release agent layer of the first release sheet is formed using a release agent that contains an MQ resin containing an alkenyl group and having, as constituent components, M units represented by formula (1)

$$R^1{}_2R^2\text{—Si—O—} \quad (1)$$

where, $R^1$ denotes an organic group and $R^2$ denotes an alkenyl group, wherein the alkenyl group content in the MQ resin ranges from 0.5 to 5 wt %, and Q units represented by formula (2)

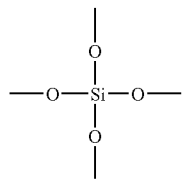

(2)

an organopolysiloxane containing an alkenyl group in the molecule that is other than the MQ resin, and
   a cross-linking agent, and
   wherein the release agent does not substantially contain particles consisting of inorganic matter, and
   wherein the first release agent layer of the first release sheet has a release force of 300 to 800 mN/50 mm relative to the stamper-receiving layer before curing.

2. The optical recording medium-producing sheet according to claim 1, wherein the alkenyl group content in the organopolysiloxane ranges from 0.1 to 3 wt %.

3. The optical recording medium-producing sheet according to claim 1, wherein the surface roughness (Ra) of the first release agent layer of the first release sheet is not greater than 0.05 μm, and the surface roughness (Rz) of the first release agent layer of the first release sheet is not greater than 4.0 μm.

4. The optical recording medium-producing sheet according to claim 1, wherein the weight-average molecular weight of the MQ resin ranges from 1000 to 7000.

5. The optical recording medium-producing sheet according to claim 1, wherein the blending amount of the MQ resin ranges from 30 to 90 parts by weight relative to 100 parts by weight of the organopolysiloxane.

6. The optical recording medium-producing sheet according to claim 1, wherein the cross-linking agent is a polyorganosiloxane having at least two hydrogen atoms bonded to silicon atoms.

7. The optical recording medium-producing sheet according to claim 1, wherein the usage amount of the cross-linking agent ranges from 0.1 to 100 parts by weight relative to a total 100 parts by weight of the organopolysiloxane and the MQ resin.

8. The optical recording medium-producing sheet according to claim 1, wherein the release agent of the first release agent layer contains a platinum-group compound as a catalyst.

9. The optical recording medium-producing sheet according to claim 8, wherein the usage amount of the catalyst ranges from 0.1 to 5 parts by weight relative to the total weight of the organopolysiloxane, the MQ resin and the cross-linking agent.

10. The optical recording medium-producing sheet according to claim 1, wherein the release agent of the first release agent layer contains an addition reaction inhibitor selected from 3,5-dimethyl-1-hexin-3-ol, 3-methyl-1-penten-3-ol, 3-methyl-3-penten-1-yne, 3,5-dimethyl-3-hexen-1-yne, tetravinyl siloxane rings and benzotriazole.

11. The optical recording medium-producing sheet according to claim 10, wherein the usage amount of the addition reaction inhibitor ranges from 0.01 to 20 parts by weight relative to a total 100 parts by weight of the organopolysiloxane, the MQ resin and the cross-linking agent.

* * * * *